United States Patent
Schraga

(10) Patent No.: US 9,522,627 B2
(45) Date of Patent: *Dec. 20, 2016

(54) VEHICLE—MOUNTED TRANSDUCER

(71) Applicant: Steven Schraga, Surfside, FL (US)

(72) Inventor: Steven Schraga, Surfside, FL (US)

(*) Notice: Subject to any disclaimer, the term of this patent is extended or adjusted under 35 U.S.C. 154(b) by 132 days.

This patent is subject to a terminal disclaimer.

(21) Appl. No.: 13/887,590

(22) Filed: May 6, 2013

(65) Prior Publication Data

US 2013/0242103 A1    Sep. 19, 2013

Related U.S. Application Data

(63) Continuation of application No. 11/836,531, filed on Aug. 9, 2007, now Pat. No. 8,446,267.

(51) Int. Cl.
*B60Q 1/00* (2006.01)
*G01S 7/40* (2006.01)
*G01S 13/93* (2006.01)
*G08G 1/16* (2006.01)

(52) U.S. Cl.
CPC .............. *B60Q 1/00* (2013.01); *G01S 7/4017* (2013.01); *G01S 13/931* (2013.01); *G01S 2013/936* (2013.01); *G01S 2013/9317* (2013.01); *G01S 2013/9321* (2013.01); *G01S 2013/9325* (2013.01); *G01S 2013/9332* (2013.01); *G01S 2013/9346* (2013.01); *G01S 2013/9353* (2013.01); *G01S 2013/9375* (2013.01); *G01S 2013/9378* (2013.01); *G01S 2013/9385* (2013.01); *G08G 1/16* (2013.01)

(58) Field of Classification Search
CPC ............... G01S 2013/9346; G01S 2013/2013; G01S 2013/936; B60Q 1/00; B60Q 7/4017
USPC ...... 340/903, 904, 436, 435, 932.2; 701/301
See application file for complete search history.

(56) References Cited

U.S. PATENT DOCUMENTS

| | | |
|---|---|---|
| 5,314,037 A | 5/1994 | Shaw et al. |
| 5,884,218 A | 3/1999 | Nimura et al. |
| 6,109,755 A * | 8/2000 | Duroux et al. ............... 359/841 |
| 6,534,884 B2 | 3/2003 | Marcus et al. |
| 6,940,398 B2 | 9/2005 | Li |
| 6,957,128 B1 | 10/2005 | Ito et al. |
| 7,147,335 B1 * | 12/2006 | Dickinson ..................... 359/841 |
| 7,148,482 B2 | 12/2006 | Harter, Jr. |
| 7,209,221 B2 | 4/2007 | Breed et al. |
| 8,446,267 B2 * | 5/2013 | Schraga ........................ 340/435 |
| 2002/0033755 A1 | 3/2002 | Ishizaki et al. |
| 2004/0145457 A1 | 7/2004 | Schofield et al. |
| 2005/0137765 A1 | 6/2005 | Hein et al. |
| 2005/0137786 A1 | 6/2005 | Breed et al. |
| 2005/0211903 A1 | 9/2005 | Harter, Jr. |
| 2006/0006988 A1 | 1/2006 | Harter et al. |

(Continued)

*Primary Examiner* — Daryl Pope
(74) *Attorney, Agent, or Firm* — Greenblum & Bernstein, P.L.C.

(57) ABSTRACT

A communication system, including an apparatus, method and program, is provided for communicating a message from a vehicle to a location. The communication system detects a distance to an object that is located at the location and a speed of the vehicle. A target distance is then calculated on the basis of the detected distance to the object and the detected speed of the vehicle. A determination is made as to whether the object is configured for communication with the vehicle. According to the determination, a message is communicated to the object from the vehicle.

36 Claims, 6 Drawing Sheets

(56) References Cited

U.S. PATENT DOCUMENTS

2006/0167594 A1 7/2006 Mah
2006/0285235 A1* 12/2006 Brouwer et al. .............. 359/877

* cited by examiner

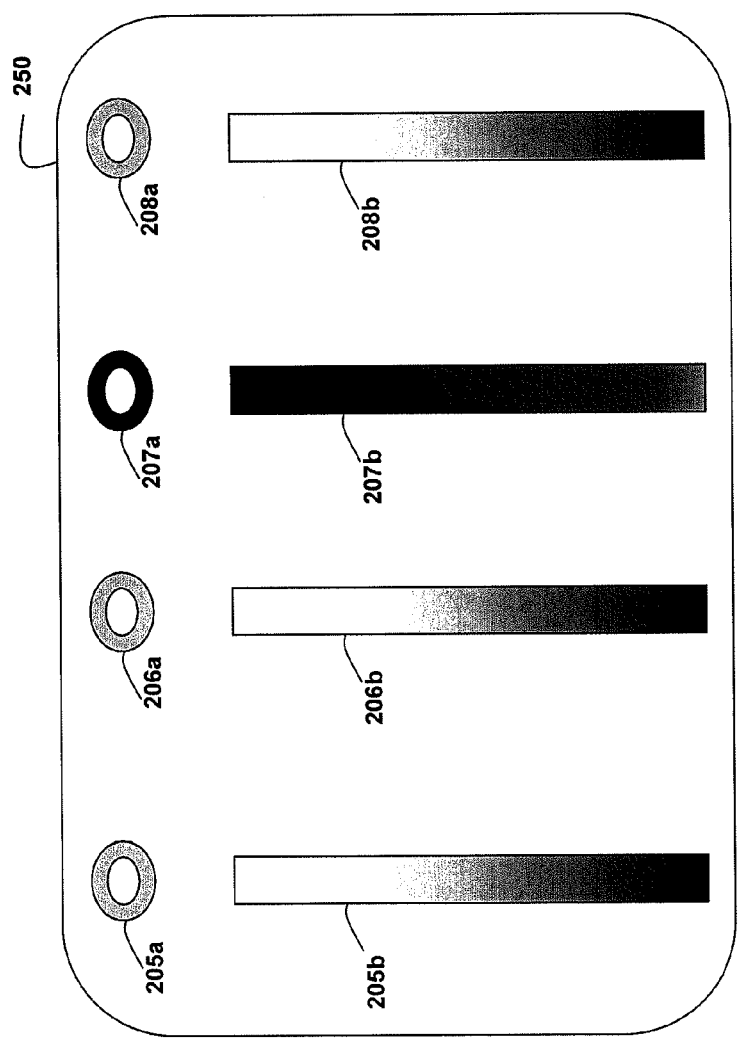
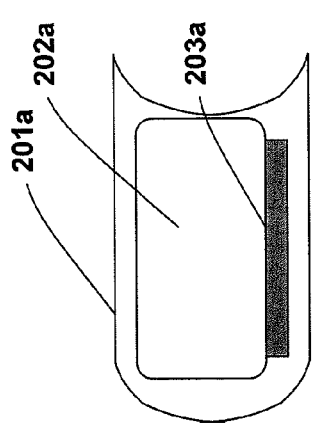
FIG. 2A
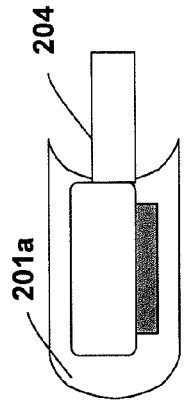
FIG. 2B
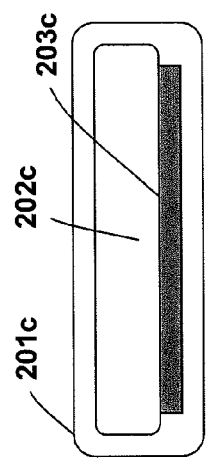
FIG. 2C
FIG. 3

VEHICLE—MOUNTED TRANSDUCER

CROSS-REFERENCE TO RELATED APPLICATIONS

The instant application is a continuation of U.S. patent application Ser. No. 11/836,531 filed Aug. 9, 2007, the disclosure of which is expressly incorporated by reference herein in its entirety.

FIELD OF THE INVENTION

The present invention relates to a method, an apparatus and a computer program for communicating information from a vehicle to a pedestrian and/or an occupant of another vehicle.

BACKGROUND INFORMATION

Vehicle manufacturers are installing proximity sensors in vehicles. The proximity sensors are typically installed in the rear of the vehicle and configured to be activated when the vehicle is placed in reverse. Some vehicle manufacturers have also installed proximity sensors in the front of vehicles, which have been configured, like the rear-mounted counterparts, to detect objects within a predetermined range of distances in front of the vehicle.

Accordingly, many vehicle users (i.e., drivers) have learned to rely on the proximity sensors to the point where they take for granted the proper functioning of the sensors. This presents a considerable danger to pedestrians, especially small children, who may not be visible from any vantage point of the driver of the vehicle. Thus, if the driver relies on the proximity sensors to avoid small objects, which are not visible from the driver's perspective, the result can be catastrophic should the proximity sensors fail unbeknownst to the driver.

Thus, an unfulfilled need exists for notifying drivers of the functional status of the proximity sensors mounted on a vehicle. Furthermore, a need exists for providing safety features that will minimize the possibility of accidental contact between vehicles and objects, or between vehicles.

SUMMARY OF THE INVENTION

According to an aspect of the invention, a process is provided for notifying a user of a status of each of a plurality of transducer elements formed in a vehicle. Moreover, a computer program is provided on a computer readable medium comprising, which when executed by a computer, causes the computer to carryout the process for notifying the user of the status of each of the plurality of transducer elements formed in the vehicle. The transducer elements detect a presence of an object and a distance to the object. The process comprises detecting a status of at least one transducer element of the plurality of transducer elements, determining an operational status of the transducer element on the basis of the detected status of the at least one transducer element, and displaying a message in accordance with the determined operational status.

The process further includes transmitting a detection signal from the at least one transducer element, receiving an incident signal from the object, the incident signal being formed from the transmitted signal being reflected from the object; determining a proximate distance to the object on the basis of the detection signal and the incident signal; and generating a manifest message in a direction of the object.

The process further includes extending a mirror system, the mirror system being configured to retract into a body of the vehicle and comprising the at least one transducer and a detector configured for receiving the incident signal from the object.

According to the exemplary, non-limiting process, the manifest message includes at least one of a visual signal and an audio signal, where the visual signal includes a textual message, and the audio signal includes an audible alert signal. A parameter of the manifest message varies in accordance with the determined proximate distance to the object, the parameter includes at least one of a frequency and an amplitude of the manifest message. Generating of the manifest message comprises generating an illumination signal from the at least one transducer element, the illumination signal having a frequency component and an amplitude component. The generating of the manifest message comprises at least one of varying the frequency component of the illumination signal according to the determined proximate distance to the object, and varying the amplitude component of the illumination signal according to the determined proximate distance of the object.

According to another aspect of the invention, a process is provided for communicating a message from a vehicle to at least one location of a plurality of locations. The process includes receiving an input message, the input message being provided from a user interface; determining whether to send the input message on the basis of a content of the input message; selecting at least one location from the plurality of locations when the content of the input message includes a message to be sent to the at least one location; and sending the message to the selected at least one location, whereby the sent message is manifested at the at least one location.

The process also includes determining whether the input message is a setup instruction on the basis of the content of the input message; and sending the setup instruction to a processor in the vehicle when the input message is determined to be a setup instruction. The sent message comprises at least one of a visual signal and an audio signal, where the visual signal includes a textual message, and the audio signal includes an audible alert signal.

According to yet a further aspect of the invention, a process is provided for communicating a message from a vehicle to at least one location of a plurality of locations. Further, a computer readable medium is provided, comprising a program, which when executed by a computer, causes the computer to carryout the process for communicating a message from the vehicle to the at least one location. The process includes detecting a distance to an object, the object being located at the at least one location; detecting a speed of the vehicle; determining a target distance on a basis of at least one of the detected distance to the object and the detected speed of the vehicle; determining whether the object is configured for communication with the vehicle; communicating a message to the object when the object is determined to be configured for communication; detecting a direction of travel of the vehicle; generating a manifest message on the basis of the detected direction of travel of the vehicle; extending a mirror system, the mirror system being configured to retract into a body of the vehicle and comprising at least one transducer configured for detecting the distance to the object; detecting a remedial action mode for the vehicle; and controlling the vehicle on the basis of the remedial action mode.

The controlling process includes controlling a speed control system on the vehicle, where the speed control system comprises a braking system on the vehicle. Further, the manifest message comprises at least one of a visual signal and an audio signal, where the visual signal includes at least one of a textual message and an illumination signal having a predetermined frequency and, where the audio signal includes an audible alert signal.

According to yet another aspect of the invention, an apparatus is provided for communicating a message to an object. The apparatus comprises a detector configured to detect a distance to the object, a generator configured to generate a message, a display configured to display the message in a direction of the object in accordance with the detected distance to the object, a plurality of illuminators, each of which is configured to surround a respective one of the plurality of energy transducers, a mirror system configured to retract into a body of the vehicle, the mirror system including said detector configured to detect the distance to the object, and a mirror system affixed to an interior compartment of the vehicle, the mirror system including said detector configured to detect the distance to the object. The display comprises an illuminator, including a plurality of parameters that are adjustable in accordance with the generated message. The detector comprises a plurality of energy transducers, each of which is configured to generate an electromagnetic energy signal having one of a predetermined wave-length and a predetermined frequency range. The predetermined wave-length comprises a wave-length in a range of wave-length values, including 380 nm to 1 mm, and the predetermined frequency range comprises a range of frequency values, including 10 Hz to 25 kHZ. Further, each of the plurality of illuminators generates a plurality of illumination signals, each of the illumination signals having a frequency that is adjustable on the basis of at least one of the detected distance to the object and an operating status of a corresponding one of the plurality of energy transducers.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout the several views of the drawings:

FIG. 2A illustrates an exemplary embodiment of a mirror system according to an aspect of the invention;

FIG. 2B illustrates a further exemplary embodiment of the mirror system of FIG. 2A, including an extending mechanism, according to an aspect of the invention;

FIG. 2C illustrates an exemplary embodiment of a rear-view mirror system according to an aspect of the invention;

FIG. 3 illustrates an exemplary display of a status of a plurality of vehicle-mounted transducers;

DETAILED DESCRIPTION OF THE INVENTION

Figure 1:
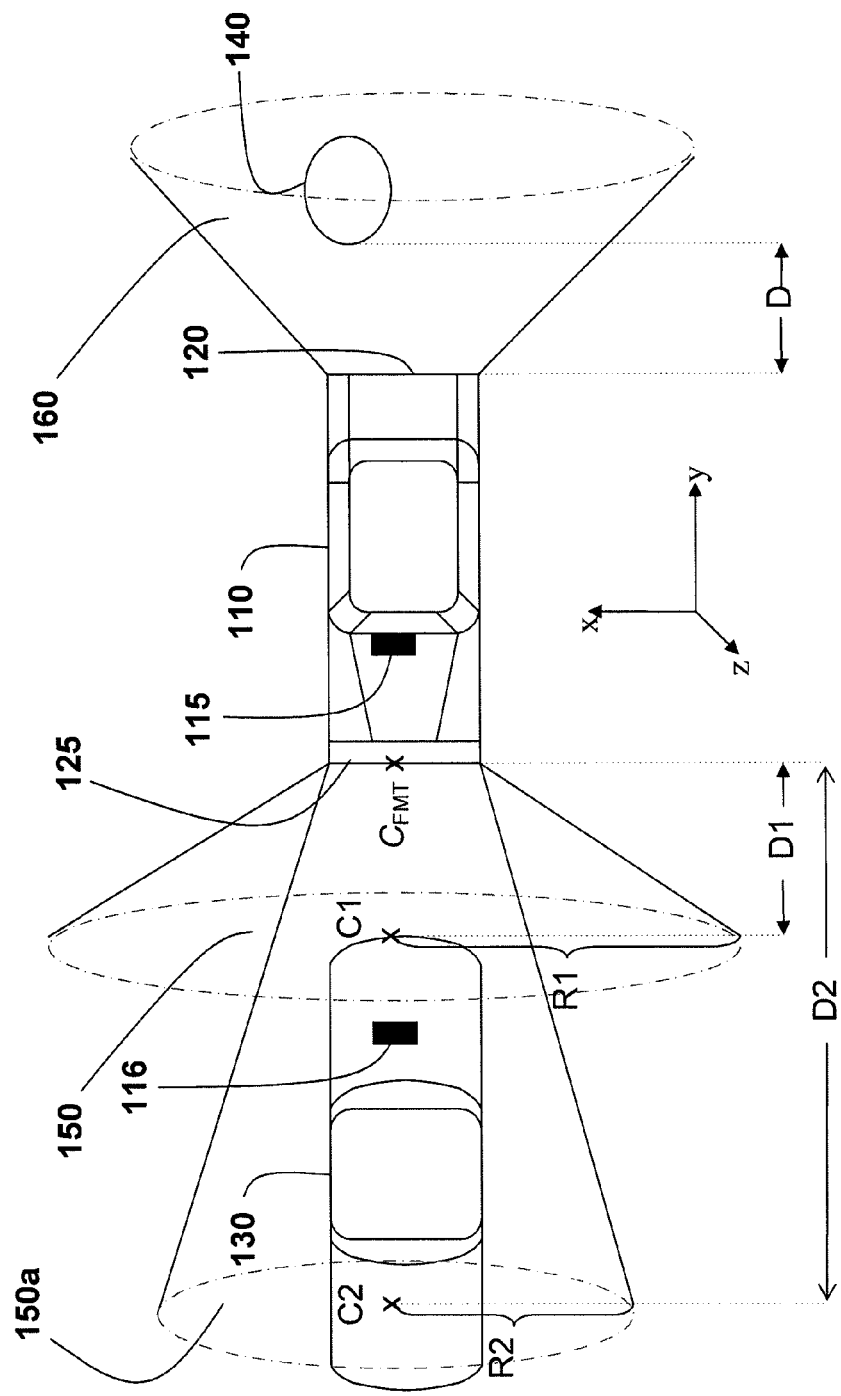
FIG. 1 illustrates an exemplary implementation of an aspect of the present invention.

An exemplary, non-limiting implementation of an aspect of the invention is shown in FIG. 1. A vehicle 110 includes a transducer controller (TC) 115 and a vehicle 130 includes a transducer controller (TC) 116. The TC 115 may be installed in an engine compartment of the vehicle 110, as shown in FIG. 1. Alternatively, the TC 115 may be installed in any other internal or external area of the vehicle 110, including, for example, the passenger compartment, the trunk compartment (e.g., TC 116 in vehicle 130) or the chassis of the vehicle, as the skilled artisan will appreciate, without departing from the scope and/or spirit of the invention. The TC 115 may be installed in the vehicle 110 at the time the vehicle 110 is manufactured, or it may be installed after the vehicle 110 has been fully assembled, such as, for example, as an after-market product.

Although the vehicle 110 in FIG. 1 is depicted as an automobile, any type of land-traversing, land-burrowing, water-traversing, submersible, or air-traversing vehicle may be installed with the present invention, including, but not limited to a truck, a bus, a sport utility vehicle, an all-terrain vehicle, a cross-over vehicle, a boat, a jet-ski, a wave-runner, an aircraft, a motorcycle, a scooter, etc. Moreover, the invention may be used in specialized vehicles, such as, for example, a tunnel digging or burrowing vehicle, a back-hoe, a tractor, a trailer, a submarine, a ship, a geotechnical tool, an environmental site assessment and/or surveying tool, a spacecraft, and the like.

Figure 4:
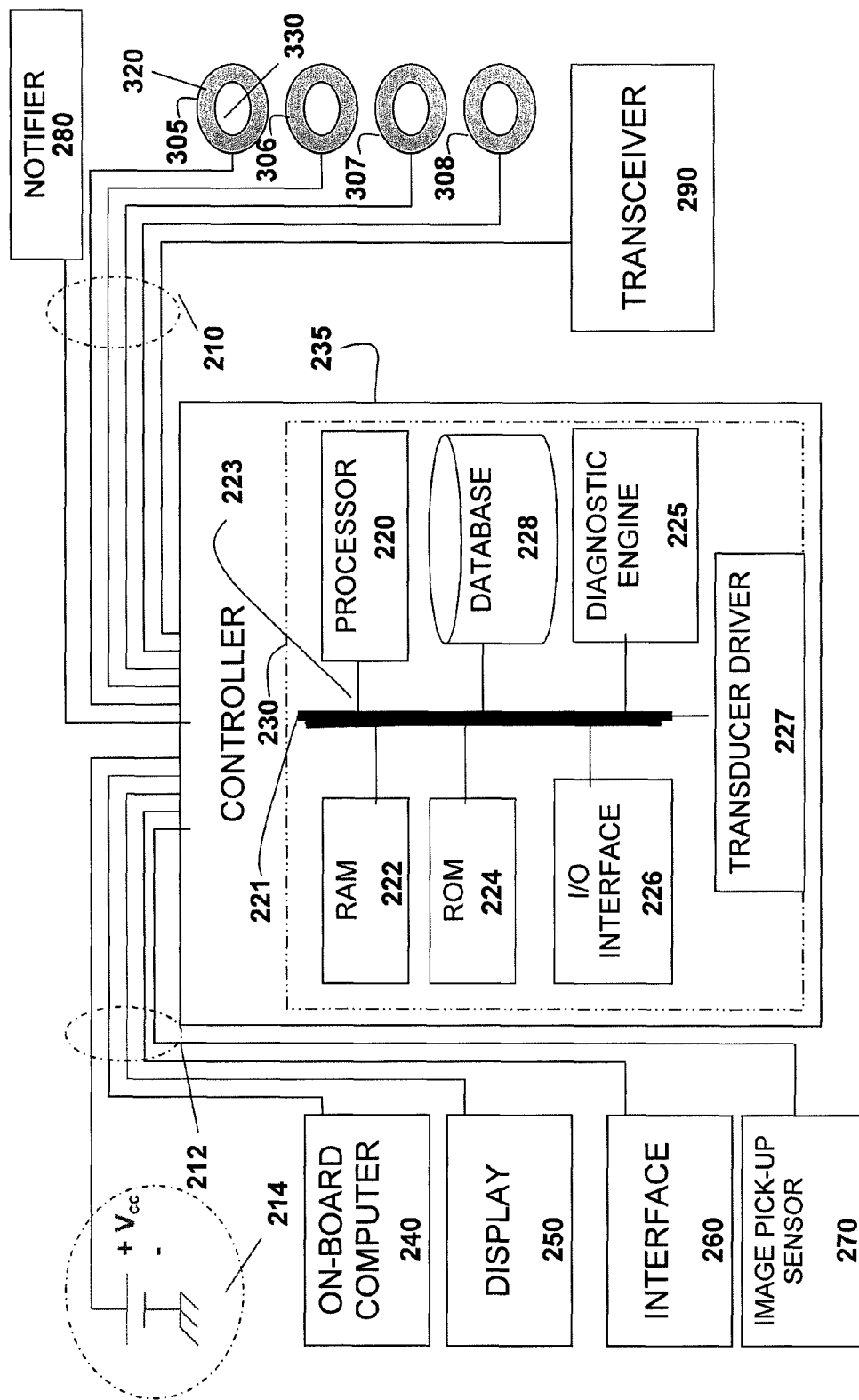
FIG. 4 illustrates an exemplary embodiment of a transducer controller (TC) according to an aspect of the present invention.

Further, the vehicle 110 includes a rear-mounted transducer array (RMT) 120 (see, e.g., transducer elements 305-308 in FIG. 4) and a front-mounted transducer array (FMT) 125, which includes transducers elements (not shown) similar to the transducer elements 305-308 shown in FIG. 4. In the disclosed embodiment, the FMT array 125 is configured to detect an object 130 (e.g., shown as an automobile in FIG. 1) in a detection/notification area 150 using electromagnetic energy signals (incident signals). The RMT array 120 is configured to detect an object 140 located within a detection/notificiation area 160, also using electromagnetic energy signals. However, it is understood that other types of detection systems, e.g., infrared, image analysis, etc., may be implemented without departing from the scope and/or spirit of the invention. In the example illustrated in FIG. 1, the object 130 is another vehicle and the object 140 is a pedestrian. Moreover, the FMT array 125 is further configured to generate a notification signal that is manifestable in the detection/notification area 150, and the RMT array 120 is further configured to generate a notification signal that is manifestable in the detection/notification area 160.

Alternatively, or in addition to object detection, the RMT array 120 and/or FMT array 125 may be configured to detect microwaves (such as, for example, X-band, K-band, Ka-band, Ku-band) and Laser signals. The detected signals are processed by the TC 115 and a message is generated by the TC 115 and displayed on a display 250 (see FIG. 3) to the user of the vehicle 110. The message may be used, for example, to alert the user of the presence of emergency vehicles within a two-mile range from the FMT array 125 or RMT array 120. The message may include, but is not limited to, for example, an identification of the type of emergency vehicle (e.g., police vehicle, ambulance, fire-engine, etc.), an estimated distance to the emergency vehicle and an estimated time to the emergency vehicle at the current speed of travel of vehicle 110. Further, the message may also include an alert regarding forth-coming traffic-signals, such as, but not limited to, for example, red-light signals, stop signs, yield signs, etc., by displaying an appropriate message indicating the existence of the red-traffic light (or stop sign, or yield sign, etc.) and an estimated distance to the traffic-light (or stop sign, or yield sign, etc.).

Although the exemplary implementation illustrates the vehicle 110 as including an FMT array 125 and a RMT array 120, the vehicle may be installed with only a single one of the FMT array 125 and the RMT array 120. Furthermore, the vehicle 110 may be installed with additional transducer arrays that may be mounted on either side or both sides of the vehicle 110, under the vehicle 110 and/or on top of the vehicle 110, depending on an implementation of the invention. Furthermore, the invention is not limited to four transducer elements in RMT array 120 (or FMT array 125), but may include any number of transducer elements (e.g., more or less than four transducers), as the skilled artisan will readily recognize and appreciate, without departing from the scope and/or spirit of the invention.

For example, referring to FIG. 2A, according to a further aspect of the invention, the vehicle 110 may be configured with at least one retractable mirror system 201a, that includes a mirror 202a and a mirror transducer (MT) array 203a. The retractable mirror system 201a selectively retracts into a body (not shown) of the vehicle 110, such as, for example, by folding into a front-fender panel (not shown) and/or hood (not shown) of the vehicle 110. Once retracted into the body of the vehicle 110, an outer casing (not shown) of the mirror system 201a becomes flush with the body of the vehicle 110. Additionally, the mirror system 201a may be operated either automatically or manually (e.g., under control of the user of the vehicle 110), to retract into the body of the vehicle 110 or to extend from the body of the vehicle 110. The mirror system 201a is positioned on the vehicle 110 such that the MT array 203a can detect objects in "blind-spots" of the vehicle 110, i.e., areas on a side of the vehicle 110 that may not otherwise be perceivable by the user of the vehicle 110 using only the mirrors on the vehicle 110.

According to a variation of the present invention, the mirror system 201a is configured to selectively extend outward from the body of the vehicle as depicted in FIG. 2B by means of an extending system 204. The mirror system 201a may be extended outward from the body of the vehicle 110 through control of the extending system 204 via an automated or manual mechanism, as the skilled artisan will recognize and understand, without departing from the spirit and/or scope of the invention.

In still another variation of the present invention, the vehicle 110 is configured with a rear-view mirror system 201c, as shown in FIG. 2C, including a mirror 202c and a rear-view mirror transducer array 203c, where the rear-view mirror transducer array array 203c is configured to detect objects in the "blind-spots" of the vehicle 110, i.e., areas on the side of the vehicle 110 that may not otherwise be perceivable by the user of the vehicle 110 using only, e.g., the mirrors 202a and/or 203c on the vehicle 110. The rear-view mirror system 201c may be located at any suitable location in the passenger compartment of the vehicle 110 that facilitates viewing of objects located behind the vehicle 110 from a vantage point of the user (e.g., the driver). For example, the rear-view mirror may be affixed to a windshield of the vehicle 110, or inner-roof of the vehicle 110, or any other location as the skilled artisan will appreciate, without departing from the spirit and/or scope of the invention. The rear-view mirror transducer array 203c is further configured to detect objects behind the vehicle 110, e.g., in a manner similar to that described herein for the RMT array 120.

Although three configurations, which are not mutually exclusive, but may be used together, of the mirror systems 201a and 201c have been described herein, the invention is in no way limited to these three configurations. Rather, the present invention may be used with any retractable or non-retractable mirror system and/or rear-view mirror system capable of being configured with a transducer array, as the skilled artisan will readily appreciate, without departing from the spirit and/or scope of the invention.

Referring to FIG. 1, the FMT array 125 and/or RMT array 120 may be configured with at least one port (not shown) having dry contacts for connection to one or more peripheral devices that may be coupled to the TC 115 at a later time. The peripheral devices may include, but are not limited to, for example, a wiring harness for a trailer, additional LEDs, an additional sound generator, and/or the like.

The detection/notification areas 150 and/or 160 may vary based on a plurality of parameters of the vehicle 110. For example, the detection areas may vary based on a drive mode (e.g., forward or reverse) of the vehicle 110, a traveling speed of the vehicle 110, a particular driver of the vehicle 110, an external light level, an external temperature, a global positioning satellite (GPS) position of the vehicle 110, and the like. An exemplary manner in which the detection areas 150 and 160 are affected by the parameters is described below.

For example, the length of a distance D1 from a centroid $C_{FMT}$ of the FMT 125 to a centroid $C_1$ of the detection/notification area 150 varies linearly as a function of a speed S of the vehicle 110, according to a relationship D1=S×k, where D1 is in feet (ft), S is in miles-per-hour (MPH) and k is a constant in feet-hour-per-mile (ft-hr/mi). In the preferred embodiment, k=2 ft-hr/mi, so that, for example, when vehicle 110 is traveling at a speed S of sixty miles-per-hour (60 MPH), D1 will be set at one-hundred-twenty feet (120 ft). Also in the preferred embodiment, the constant k may be varied as a function of ambient conditions outside of the vehicle 110, so that the constant k is increased in hazardous conditions, such as, for example, rain, snow, sleet, freezing temperatures, etc. It is understood that, rather than the United States system of measurement, the metric system may instead be employed, including the measures of meters and kilometers-per-hour.

Radius R1 of the detection area 150 may also be changed as a function of the speed S of the vehicle 110. For example, as shown in FIG. 1, radius R1 of the detection area 150 may be linearly changed to R2 of the detection area 150a as an inverse function of the speed S of the vehicle 110, such that the faster vehicle 110 travels, the smaller the radius R1 of the detection area 150 becomes.

In FIG. 1, the world coordinate axis-X and axis-Y form a plane that is parallel to the figure, and the world coordinate axis-Z is perpendicular to the plane of the figure. The centroid $C_{FMT}$ has world coordinates $X_{FMT}$, $Y_{FMT}$, $Z_{FMT}$, where $X_{FMT}$ is perpendicular to both $Y_{FMT}$ and $Z_{FMT}$, and $Y_{FMT}$ is perpendicular to $X_{FMT}$ and $Z_{FMT}$. Further, the centroid C1 has world coordinates $X_1$, $Y_1$, $Z_1$, and the centroid C2 has world coordinates $X_2$, $Y_2$, $Z_2$. In the example illustrated in FIG. 1, world coordinates $X_1=X_2=X_{FMT}$, $Z_1=Z_2=Z_{FMT}$, $Y_2=D2+Y_{FMT}$ and $Y_1=D1+Y_{FMT}$. However, it is understood that the coordinate values $X_{FMT}$, $Y_{FMT}$, $Z_{FMT}$, $X_1$, $Y_1$, $Z_1$, $X_2$, $Y_2$ and $Z_2$ may vary depending on a particular application, as the skilled artisan will recognize and appreciate, without departing from the spirit and/or scope of the invention. For example, it is understood that the coordinates of the centroid C1 may also vary (i.e., in addition to varying as a function of the speed S of the vehicle 110) as a function of the direction of travel of the vehicle 110, by, for example, tracking the direction of the steering of the vehicle 110, as is known in the vehicle steering art.

According to the illustrative, but non-limiting example of FIG. 1, as the vehicle 110 moves in a forward direction (e.g., moving from the right to the left of FIG. 1), the detection/notification area 150 is lengthened to the detection/notification area 150a, thereby sensing on-coming objects at much further distances, as well as manifesting a signal to the on-coming objects at further distances. Further, the radius R1 of the detection/notification area 150 may be reduced to a radius R2 for the detection/notification area 150a in order to minimize the possibility of sensing noise, such as, for example, objects along the perimeter of a roadway, as well as improving energy efficiency by manifesting a notification signal in a narrower, more focused detection/notification area 150a.

Furthermore, when the vehicle 110 is stationary, the FMT array 125 and RMT array 120, as well as any additional arrays (not shown) that may be mounted on the sides of the vehicle 110, may be coupled to an alarm system (not shown) of the vehicle 110 to detect objects that are intrusively close to or in contact with the vehicle 110. The alarm system may be configured to activate an alarm notification message, such as, for example, by flashing lights, generating a high intensity sound and/or transmitting an alert signal to a remote device, such as, for example, a mobile telephone when, for example, an object comes into contact with the vehicle 110 or comes close to touching the vehicle 110. It is understood that the alarm system should preferably include a time-out feature and a reset feature so that the alarm notification message will be ceased after a predetermined time has elapsed, such as, for example, thirty seconds.

FIG. 3 illustrates an exemplary, non-limiting display of a status of the RMT array 120 and/or the FMT array 125. According to an aspect of the preferred embodiment of the invention, the four display icons 205a through 208a are displayed on a display 250 (shown in FIG. 4) of vehicle 110, depicting a functional status for each of the corresponding transducer elements 305 through 308 (in FIG. 4) of the RMT array 120. Four additional display icons 205b through 208b are also displayed on the display 250 for the RMT array 120, depicting a status signal of an object 140 (in FIG. 1) located proximate the vehicle 110. However, it is understood that similar icons, i.e., similar to display icons 205a through 208a and 205b through 208b, may also be displayed on display 250 of the vehicle 110 for the FMT array 125. The exemplary display icons 205a through 208a each have an elliptical shape, and the additional display icons 205b through 208b each have a bar shape, but are not limited in any way to an elliptical and/or bar shape, as the skilled artisan will recognize, without departing from the scope and/or spirit of the invention.

In the illustrative embodiment, the display icons 205a through 208a, which are configured as, but not limited to elliptical shapes, display a functional status of a corresponding transducer element 305 through 308 (shown in FIG. 4), respectively. The display icons 205a, 206a and 208a are depicted as showing a normal operational status for corresponding transducer elements 305, 306 and 308. Meanwhile, display icon 207a is depicted as showing a mal-functioning operational status for corresponding transducer element 307. In other words, display icons 205a, 206a and 208a indicate that transducer elements 305, 306 and 308 are functioning in a prescribed manner, but display icon 207a indicates that transducer element 307 is not functioning in a prescribed manner and may require inspection and/or remedial attention, such as, for example, replacement.

The illustrated display icons 205b through 208b, which are configured as, but not limited to bar-shapes, display a sensory output signal from the corresponding transducer elements 305 through 308 (shown in FIG. 4). The sensory output signal may correspond to a status of an object or a status of an ambient condition detected by at least one of the transducer elements 305 through 308. For example, referring to FIG. 1, the status of object 140 may be detected by the transducer elements 305 through 308, which would be included in the RMT array 120. The detected status may include, for example, such attributes as a distance to the object 140 from the RMT array 120, a temperature of the object 140, a material composition of the object 140, a gas emitted from the object 140, an ionizing radiation emitted by the object 140, and the like. The detected status may also include a status of ambient conditions within the detection areas 150 and/or 160, including, for example, a temperature of the gas and/or liquid, a composition of the gas and/or liquid, an ionization radiation emanating from the gas and/or liquid, and the like.

Although the exemplary display icons 205a through 208a and 205b through 208b are shown as elliptical and bar-shaped icons in FIG. 3, respectively, the shape of the display icons is in no way limited to ellipses and/or bar-shapes. Rather, the display icons 205a through 208a may each be configured as, for example, a circle, a rectangle, a triangle, a three-dimensional sphere, a three-dimensional square, a three-dimensional pyramid, an alphanumeric character(s), or any combination of a circle, a rectangle, a triangle, a three-dimensional sphere, a three-dimensional square, a three-dimensional pyramid and/or an alphanumeric character(s) as the skilled artisan will readily recognize and appreciate, without departing from the scope and/or spirit of the invention. Furthermore, the display icons 205a through 208a and 205b through 208b may be superimposed on a display of a moving image of the detection areas 150 and/or 160, which is captured by the image pick-up sensor 270 (shown in FIG. 4).

FIG. 4 illustrates an exemplary controller 235 used with the transducer controller (TC) 115 shown in FIG. 1. The controller 235 includes a random access memory (RAM) 222, a read-only memory (ROM) 224, an input/output (I/O) interface 226, a processor 220, a database 228, a diagnostic engine 225, a transducer driver 227 and a bus 221. In the preferred embodiment, each of the RAM 222, ROM 224, I/O 226, processor 220, database 228, diagnostic engine 225 and transducer 227 is connected to the bus 221 via a wired lead and/or conductive trace 223. The RAM 222, ROM 224, I/O 226, processor 220, database 228, diagnostic engine 225, transducer 227, bus 221 and conductive traces 223 may be formed on a single board 230, as shown in FIG. 4, or on multiple boards. The controller 235 is enclosed in a casing made of a material, such as, for example, aluminum, which is resistant to high temperatures, high moisture and large vibrations, as may be experienced within the vehicle 110.

The controller 235 is coupled to a power source $V_{cc}$ (such as, but not limited to, for example, the vehicle's 110 operating battery, which may be a six-volt direct current (6V DC), a twelve-volt direct current (12V DC), an eighteen-volt direct current (18V DC) or a twenty-four-volt direct current (24V DC) power source), an on-board computer 240, a display 250, an interface 260 and an image pick-up sensor 270 via wired leads 212, or, alternatively, via wireless interfaces. The controller 235 is further coupled to a notifier 280, a transceiver 290 and transducer elements 305 through 308 via wired leads 210, or alternatively, via wireless interfaces. In this regard, the transducer elements 305 through 308 may be coupled to the controller 235 through wireless links, such as, for example, optical or electromagnetic frequency communications devices (for example, infrared diode transceivers, radio frequency transceivers, etc.).

The display 250 may be, for example, a liquid crystal display (LCD), a light emitting diode (LED) display, a plasma display panel (PDP), an organic light emitting diode (OLED) display, a surface-conduction electron-emitter display (SED), a carbon nanotube (CNT), a nanocrystal display (NCD), or cathode ray tube (CRT), and/or the like. Moreover, the display device may include user-mounted devices such as, for example, a head-mount display, and/or a three-dimensional display such as, for example, a holographic display. Further, the display 250 may be a portable computer device, such as, for example, a personal data assistant (PDA), a telephone device, a portable music player, a portable game device, or any other portable computer device capable of displaying still and/or moving images, which may be coupled to the controller 235 via a wired or wireless communication link. The display 250 may optionally include audio speakers (not shown), integrally configured in the display 250.

The display 250 receives display signals from the controller 235 and the image pick-up sensor 270. The display 250 displays images of objects that are captured in the detection/notification areas 150 and/or 160 (shown in FIG. 1) by the image pick-up sensor 270. The display 250 also displays transducer display icon images superimposed on the captured images, which are generated by processor 220. The transducer display icon images include the display icons 205a through 208a and 205b through 208b (shown in FIG. 3), discussed above.

Additionally, the display 250 is configured to display notification signals generated by the processor 220 in response to received communication signals from transceiver 290. For example, the transceiver 290 may receive a communication signal from another transceiver 290 located in another vehicle. The communication signal may be an arbitrary message input by the user of the other vehicle (e.g., via a user interface 260 located in the other vehicle), or a notification message generated by a controller 235 located in the other vehicle.

Referring to FIG. 1, for example, the controller 235 of FIG. 4 (included in the TC 15 of vehicle 130 in FIG. 1) is located in the vehicle 130 and generates a notification message that notifies the vehicle 110, via the transceiver 290 (of FIG. 4) that is located in vehicle 130, that the vehicle 110 is too close to vehicle 130 and that the vehicle 110 should slow down. In generating the notification message, the controller 235 considers, for example, ambient conditions, such as, for example, whether it is raining, or whether the temperature is below freezing, so as to determine a proper following distance for vehicle 110. In response, depending on the particular configurations for the controller 235 set by the user of vehicle 110, the vehicle 110 may automatically decelerate and/or apply the vehicle's brakes to slow down the vehicle 110, and/or a warning message to slow down may be displayed to the user of vehicle 110 via display 250.

In the controller 235, the I/O interface 226 functions as a gateway for all data and all instructions input or output from the controller 235. The RAM 222 functions as a working memory for the controller 235. The ROM 224 stores non-varying data and instructions, such as, for example, firmware, look-up-tables (LUTs), and the like. The database 228 stores logging and reporting information, such as, for example, historical status information for each of the transducer elements 305 through 308. The diagnostic engine 225 monitors various attributes for each of the transducer elements 305 through 308, such as, for example, whether any one of the transducer elements is mal-functioning. The transducer driver 227 drives the transducer elements 305 through 308, the image pick-up sensor 270, the transceiver 290 and the notifier 280, the vehicle speed control (not shown) and the vehicle braking system (not shown), as discussed below with regard to FIG. 5.

The on-board computer 240, which is typically mounted by vehicle manufacturers in the passenger compartment of vehicles under the passenger-side of the dashboard, provides status information to the controller 235 for various parameters for the vehicle 110. The status information provided by the on-board computer 240 includes, but is not limited to, for example, the vehicle speed S at which the vehicle 110 is traveling, the drive mode of the vehicle (i.e., reverse mode or forward mode), the ambient temperature and moisture outside the vehicle 110, the global positioning satellite (GPS) coordinates of the vehicle 110, and the like.

Alternatively, if the vehicle 110 is not equipped with an on-board computer 240, a self-contained computer (not shown), which may or may not include a GPS receiver, may be implemented, as is known in the art, and coupled to the controller 235, as the skilled artisan will understand, without departing from the spirit and/or scope of the invention.

The user interface 260 receives user instructions for modifying parameters of the controller 235, the display 250, the image pick-up sensor 270, the notifier 280, the transceiver 290 and the transducer elements 305 through 308. Although shown as a separate component, the user interface 260 may be configured as an integral part of the display 250, such as, for example, a touch-screen display panel.

The image pick-up sensor 270 is configured to capture moving and/or still images of objects within the detection/notification area 150 and/or 160 (shown in FIG. 1) and to provide the captured images to the processor 220. The image pick-up sensor 270 senses electromagnetic energy signals and captures images within the infrared and visible light spectrum (i.e., wavelengths in the range of 380 nm to 1 mm) The captured images are processed by the processor 220 and displayed on the display 250. The image pick-up sensor 270 may be mounted on the front of the vehicle 110, for example, proximate to the FMT array 125, and/or the back of the vehicle 110, for example, proximate to the RMT array 120 (shown in FIG. 1). The image pick-up sensor 270 is capable of capturing still and/or moving images that may be stored long term in database 228. In accordance with a received instruction from the user via user interface 260, the captured images may be stored in the database 228 in real-time or after annotation of the captured images by the user via the interface 260.

It is understood that depending on the application of the invention, the image pick-up sensor 270 may be configured to capture images in the ultraviolet, infrared, and/or x-ray electromagnetic spectrums.

The notifier 280 is a transducer element that manifests a visible and/or audible message outside of the vehicle 110. The notifier 280 may include, for example, an illuminator, such as, for example, a liquid crystal display (LCD), a light emitting diode (LED) display, a plasma display panel (PDP), an organic light emitting diode (OLED) display, a surface-conduction electron-emitter display (SED), a carbon nanotube (CNT), a nanocrystal display (NCD), a cathode ray tube (CRT), and/or the like. The notifier 280 may be located in the vehicle 110 or external to the vehicle 110. For example, the notifier 280 may be configured as a translucent display mounted on the rear window (not shown) of the vehicle 110, or used in place of the rear window of the vehicle 110. Moreover, the notifier 280 may be configured as a set of, for example, LEDs mounted in the FMT array 125 and/or the RMT array 120 (shown in FIG. 1).

Furthermore, the notifier 280 may additionally (or alternatively) include an audible signal generator, such as, for example, a speaker, that generates signals ranging in frequency from, for example, 10 Hz to 25 kHz, where the frequency of the generated signals increases inversely proportionate to the distance, for example, from the vehicle 110 to the object 140 (shown in FIG. 1). Thus, as the distance between the vehicle 110 and the object 140 decreases, the frequency of the generated audible signal increases. The amplitude of the audible signal generated by the notifier 280 also increases inversely proportionate to the distance between the vehicle 110 and the object 280, so that the generated audible signal will become louder as the distance between the vehicle 110 and the object 140 decreases. Additionally, the amplitude and/or the frequency of the generated audible signal may differ amongst the various transducer elements 305 through 308 on the basis of the distance of each particular transducer element from the object; such that, the transducer element, e.g., transducer element 306, closest to the object 140 (shown in FIG. 1), will generate the loudest and highest frequency signal of the four exemplary transducer elements 305 through 308. The notifier 280, including the audible generator, may be located in the FMT array 125 and/or the RMT array 120, or any other location of the vehicle 110 practical for generating an audible signal that will be manifested outside of the vehicle 110, as the skilled artisan will recognize and appreciate, without departing from the spirit and/or scope of the invention.

According to the preferred embodiment, the notifier 280 operates under control of the processor 220 (the message generator) and/or transducer driver 227. The range of frequencies for the signals generated by the notifier 280 includes frequencies perceivable by only animals (not humans), as well as frequencies perceivable by both animals and humans. According to an aspect of the invention, the notifier 280 generates signals within a frequency range only perceptible to animals, such as, for example, a deer, a skunk, a bear, a raccoon, an opossum, a cat, a dog, a squirrel, and the like, so that the notifier 280 may function to deter animals from a path of the vehicle 110. The frequencies of the signals generated by the notifier 280 are controllable by the user via the interface 260 (in FIG. 4). Furthermore, the amplitude of the signals generated by the notifier 280 are increased as a function of the speed S of the vehicle 110, so that the faster vehicle 110 travels, the greater the magnitude of the signal generated by the notifier 280.

In the preferred embodiment, the transducer elements 305 through 308 are each identical in structure and function. However, as the skilled artisan will recognize, the transducer elements 305 through 308 may have different structures that perform different functions. Referring to, for example, transducer element 305, the transducer element includes an LED 320 (shown as the shaded region in FIG. 4) surrounding a proximity sensor 330. The LED 320 is controlled by the transducer driver 227, as discussed below. Moreover, the LED 320 may include any color LED in the visible spectrum, including, for example, red, blue, green, yellow, orange, violet, purple, etc.

The transceiver 290 is configured to communicate with a similar transceiver located in another vehicle, which is also equipped with a TC 115 (shown in FIG. 1), including another transceiver 290 and another controller 235. The transceiver 290 includes a radio-frequency (RF) transmitter and a radio-frequency (RF) receiver. Alternatively, an infra-red (IR) transmitter and an infra-red (IR) receiver may be used instead of the RF transmitter-receiver pair. The skilled artisan will readily recognize that any transmitter-receiver pair capable of communicating signals across a predetermined distance, such as, but not limited to, for example, greater than 200 feet, may be used for the transceiver 290, without departing from the spirit and/or scope of the invention.

Figure 5:
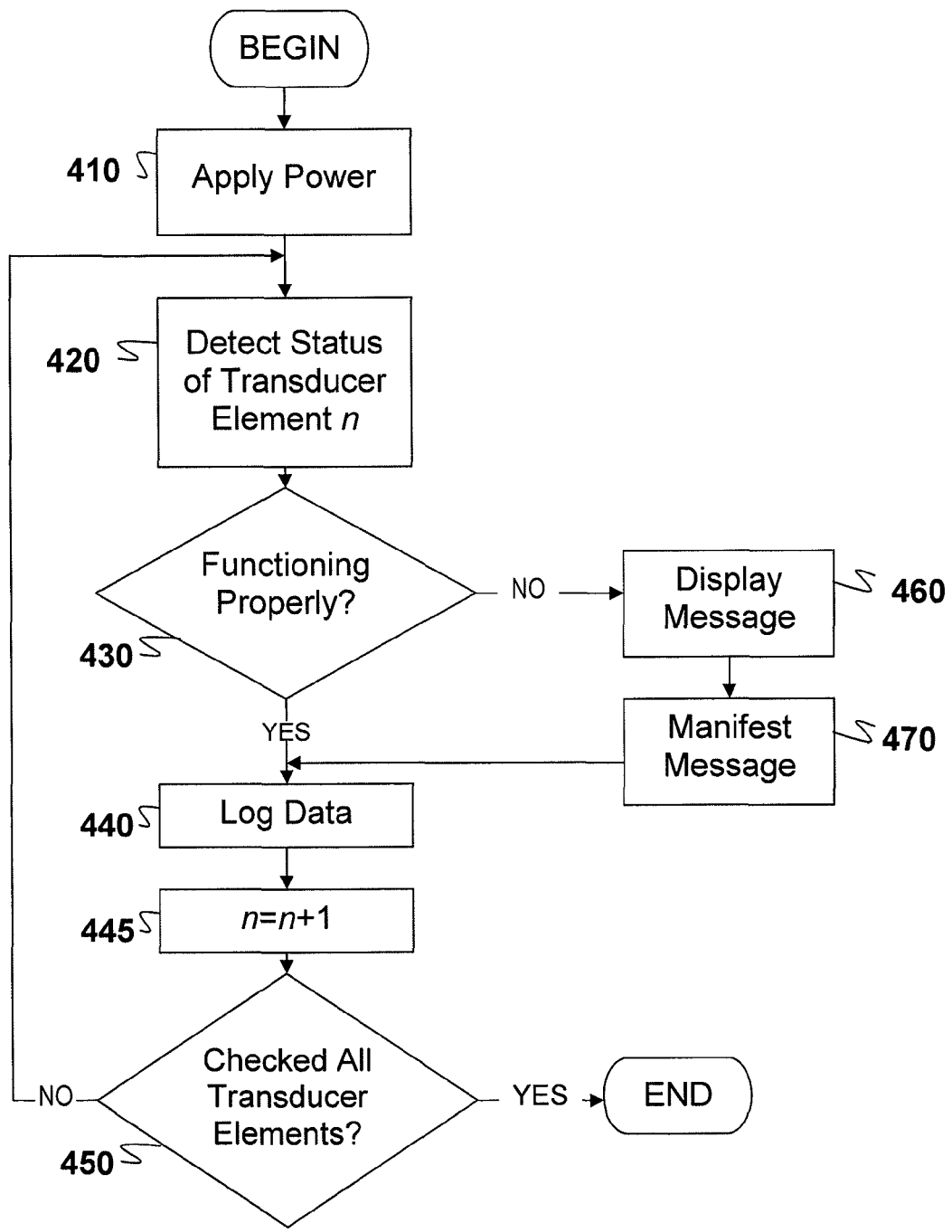
FIG. 5 illustrates an exemplary transducer element fault detection process according to an aspect of the invention.

FIG. 5 illustrates an exemplary transducer element fault detection process that is carried out by the processor 220 according to an aspect of the invention.

Referring to FIG. 5, the controller 235 is supplied with a power supply signal $V_{cc}$ at step 410 when, for example, a user of the vehicle 110 activates the vehicle by, for example, turning an ignition key to an ON position, depressing an ON button, inputting an activate instruction in the interface 260, or the like.

The controller 235 detects the status of a first transducer element n, for example, transducer element 305, at step 420. In this regard, the controller 235 may detect a received voltage signal from transducer element n and compare the received voltage signal to a predetermined range of acceptable voltage values. Alternatively, the transducer element n may be a smart device that performs a self-diagnosis process and provides a health status signal to the controller 235, indicating whether the transducer element is healthy.

The controller 235 determines, at step 430, whether the transducer element n is functioning properly by, for example, comparing the received voltage signal to a predetermined range of acceptable values, or by comparing a received health status signal to a set of values in the look-up-table (LUT) that is stored in the ROM 224. If the controller 235 determines that the transducer element n is functioning properly ("YES" at step 430), then the controller 235 logs the results of the status check of step 420 and the determination of step 430 in the database 228, including the identity of the particular transducer element n, e.g., transducer element 305, a flag indicating a healthy status, a flag indicating a functioning status, and a time stamp indicating the time at which the status check was performed.

The controller 235 then increments the transducer element n to n+1 at step 445, thereby proceeding to the next transducer element, e.g., transducer element 306. At step 450, a determination is made as to whether all of the transducer elements, e.g., transducer elements 305 through 308, in the FMT array 125 and/or RMT array 120 have been checked. If a determination is made that all of the transducer elements have not been checked ("NO" at step 450), the process returns to step 420 and the next transducer element in FMT array 125 and/or RMT array 120 is checked. If a determination is made that all of the transducer elements have been checked ("YES" at step 450), the process ends.

If the controller 235 determines at step 430 that the transducer element n is not functioning properly ("NO" at step 430), then the controller 235 sends a message signal, via communication link 212, to display 250 to cause, for example, the display icon 207a, to be displayed, at step 460. The controller 235 then sends a message manifest signal (step 470) to, for example, the LED 320 on transducer element 307 and/or the notifier 280, causing the LED 320 to emit a light having a predetermined color indicative of a mal-functioning transducer element, such as, for example, a red light, and/or causing the notifier 280 to generate an audible signal indicating a mal-functioning transducer. The audible signal may include, for example, a voice alert generated by a speech synthesizer. The controller 235 then logs the results of the status check of step 420 and the determination of step 430, at step 440, in the database 228, including the identity of the particular transducer element n, e.g., transducer element 305, a flag indicating an unhealthy status, a flag indicating a non-functioning status, a time stamp indicating the time at which the status check was performed and an error code indicating a probable cause for the malfunction of the transducer element n. The process then ends.

Although the sequence for the process of FIG. 5 is shown such that step 460 precedes step 470, the sequence is only exemplary. The skilled artisan will understand that the sequence of, for example, the steps 460 and 470 may be carried out in any manner, including a parallel, simultaneous execution for both steps of the process.

Further, a fault detection program may be provided on a computer readable medium for carrying out the above discussed fault detection process. As the skilled artisan will readily understand, the fault detection program includes a code section for carrying out each of steps 410 through 470, discussed above.

Figure 6:
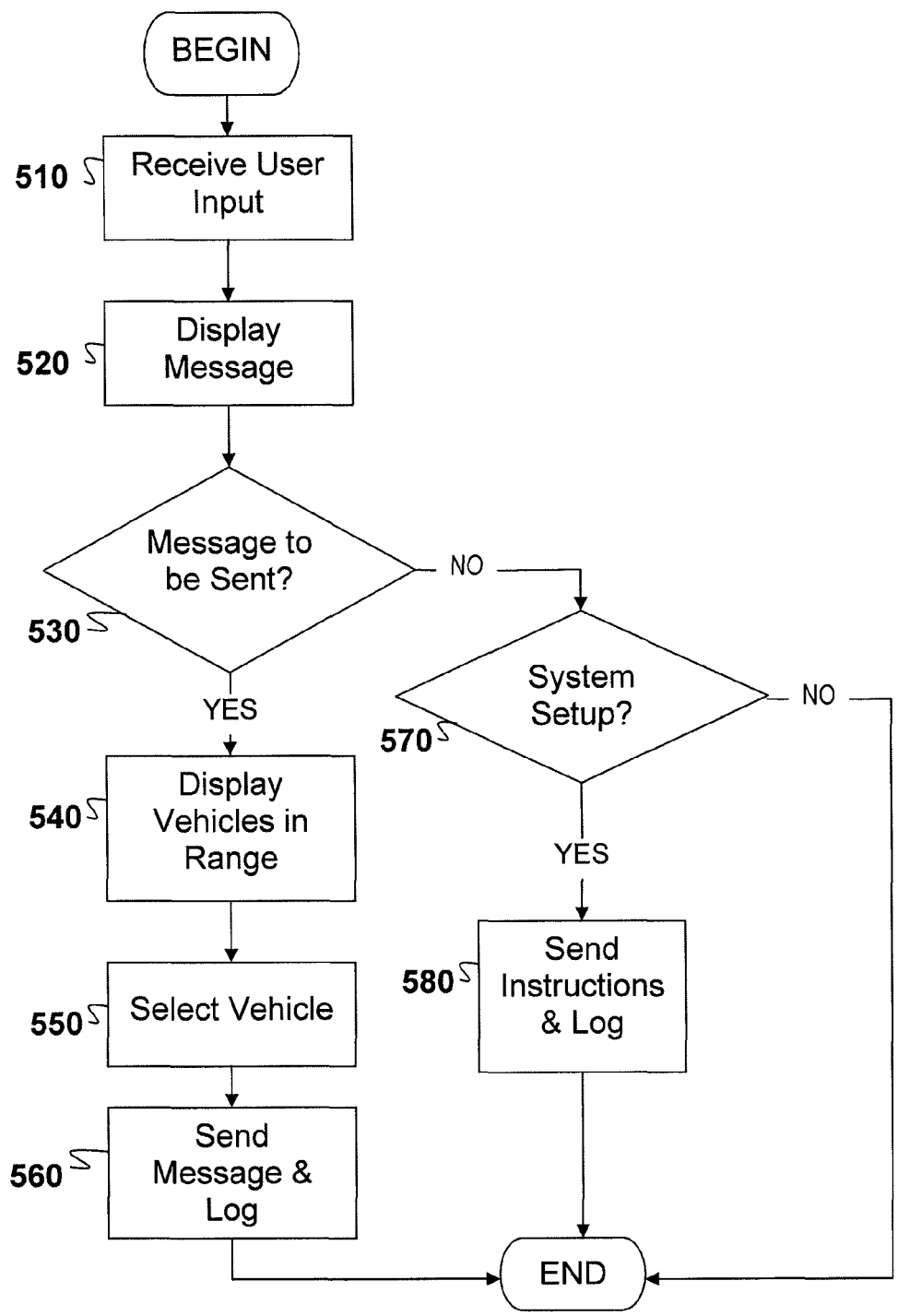
FIG. 6 illustrates an exemplary communication process according to an aspect of the invention.

FIG. 6 illustrates an exemplary communication process carried out by the controller 235, according to an aspect of the invention.

Referring to FIG. 6, a user input is received via interface 260 at step 510. The received user input may include a setup instruction, such as, for example, an instruction to adjust the sensitivity of the FMT array 125 and/or RMT array 120, or a particular transducer element in the FMT array 125 and/or RMT array 120, or an instruction to adjust a parameter of the image pick-up sensor 270 (such as, for example, a night-vision mode or a day-light vision mode, white balance, color temperature, brightness, contrast, image stabilization, image tracking, and the like), or an instruction to adjust a parameter of the display 250 (such as, for example, an input video source, contrast, brightness, aspect-ratio, and the like), or an instruction to adjust a parameter of the notifier 280 (such as, for example, whether to generate an audible sound signal, a particular type of sound signal to be generated, an amplitude and/or frequency of the sound signal to be generated, a color of a particular LED 320 to be illuminated, an externally visible message to be displayed on an externally mounted display (not shown), and the like), or an instruction to adjust a parameter of the transceiver 290 (such as, for example, a particular vehicle 130 to be communicated with, a carrier frequency to be used for external communication, and the like), or an instruction to adjust a parameter of the transducer driver 227 (such as, for example, an installation of a peripheral device to be coupled to, for example, dry contacts provided in the FMT array 125 and/or RMT array 120, an automatic brake system control mode, a manual brake system control mode, a speed control mode, and the like), or an instruction to adjust a parameter of the diagnostic engine 225 (such as, for example, a selection instruction to select a particular component to be diagnosed, including the image pick-up sensor 270, the display 250, the on-board computer 240, the transducer elements 305 through 308, the transducer driver 227, the transceiver 290 and/or the notifier 280). It is understood, however, that user input instructions received by the interface 260 are in no way limited to the above mentioned instructions. Rather, a user may input any instruction (via, for example, interface 260, which may be formed integrally with the display 250) to control any necessary parameter of the controller 235, the on-board computer 240, the display 250, the image pick-up sensor 270, the notifier 280, the transceiver 290 and/or the transducer elements 305 through 308 to carry out an application of the invention, as the skilled artisan will recognize, without departing from the spirit and/or scope of the invention.

Furthermore, the received input at step 510 may include any arbitrary message, such as, for example, a textual message (such as, e.g., a visual alert signal), an audible message (such as, e.g., an audible alert signal) and/or a visual message that the user of vehicle 110 desires to send to the user of vehicle 130 (shown in FIG. 1).

The received user input containing, e.g., a message and/or an instruction, is displayed on display 250 at step 520. A determination is made at step 530 as to whether the received user input is an instruction or a message to be sent to another vehicle. If it is determined that the received user input is a message to be sent to another vehicle ("YES" at step 530), then the controller 235 causes the display 250 to display a listing of vehicles within a communication range of the transceiver 290, at step 540. At step 550, a user selection is received for a particular vehicle (from the vehicle listing displayed at step 540) to which the user wishes to send the message. The message is then sent to the selected vehicle and logged into the database 228 at step 560, including the particular message, a time stamp when the message was sent, the vehicle to which the message was sent, and the like. After the message is sent and the related information logged into the database 228, the process ends.

A determination of the specific vehicles that are within range may be made, for example, by detecting, for example, a thirty-two-bit identifier that is broadcast by the transceiver 290 of each vehicle equipped with the invention. The identifier may be attainable through a fee-for-service arrangement with a service provider that allows a user to retrieve (e.g., using transceiver 290) and download a look-up-table, including, for example, license plate numbers correlated to specific thirty-two-bit identifiers, into RAM 222 and/or ROM 224.

If a determination is made that the received user input at step 510 is not a message to be sent to another vehicle ("NO" at step 530), then, at step 570, the controller 235 determines whether the received user input is an instruction to adjust a parameter of at least one of the following components: the on-board computer 240, the display 250, the interface 260, the image pick-up sensor 270, the diagnostic engine 225, the transducer driver 227, the notifier 280, the transceiver 290 and/or the transducer elements 305 through 308. If a determination is made that the received user input is an instruction to adjust a parameter of at least one of the above components ("YES" at step 570), then the instruction is processed by processor 220 and a further instruction is sent to the appropriate component instructing an adjustment of the parameter and the adjusting settings are stored in the database 228 at step 580. For example, the received user input may include an instruction to activate the LED 320 on any one or more of the transducer elements 305 through 308 each time the vehicle 110 is placed in a reverse mode. The processor 220 will generate a further instruction, based on the received user input, and send the further instruction to, e.g., the transducer 227 to activate the LED 320 to illuminate a white light on the one or more transducer elements 305 through 308 each time the vehicle 110 is placed in a reverse mode. After the further instruction is sent to the appropriate component(s) and the settings stored in the database 228 at step 580, the process ends.

However, if a determination is made by the controller 235 that the received user input is not an instruction to adjust a parameter of at least one of the above components ("NO" at step 570), then the process ends.

A communication program may be provided on a computer readable medium for carrying out the above discussed communication process. As the skilled artisan will readily understand, the setup program includes a code section for carrying out each of steps 510 through 580, discussed above.

Figure 7:
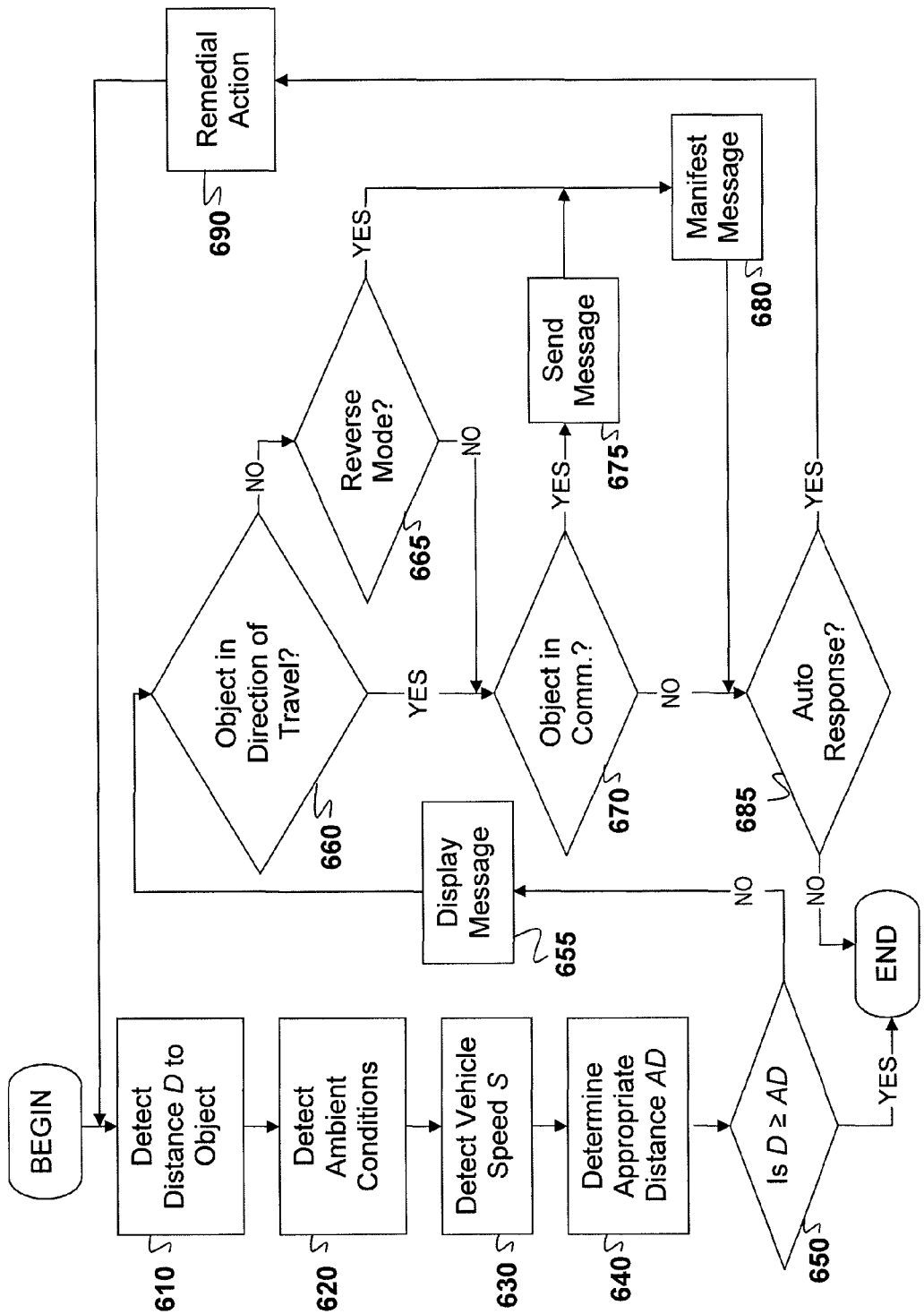
FIG. 7 illustrates an exemplary detection/notification process according to an aspect of the present invention.

FIG. 7 illustrates an exemplary detection/notification process that is carried out by the controller 235, according to an aspect of the invention. The exemplary detection/notification process depicted in FIG. 7 will be described with reference to, but not limited to, the exemplary application shown in FIG. 1 and the controller 235 shown in FIG. 3. In order to simplify the description, the process is described from the vantage point of the vehicle 110. It is understood, however, that the same process described below may be carried out in vehicle 130, when equipped with the TC 116, including the controller 235 described above, or any other vehicle equipped with the invention that is within range of communication with vehicle 110.

Referring to FIG. 1 and FIG. 7, the vehicle 110, which is equipped with the transducer controller (TC) 115, detects a distance D to the object 140 and a distance D1 to the vehicle 130 (which is equipped with the TC 116) at step 610, via RMT array 120 and FMT array 125, respectively. In the preferred embodiment, each of the RMT array 120 and FMT array 125 include at least one laser and at least one light detector. According to the preferred embodiment, the laser in the FMT array 125 generates pulsed laser signals that are reflected by the vehicle 130, which is positioned in the laser trajectory as shown in FIG. 1. The reflected laser signals are detected by the light detector included in the FMT array 125 and the distance D1 to the vehicle 130, as well as a speed $S_2$ at which the vehicle 130 is traveling, where $S_2$ is in units of miles-per-hour (MPH), is calculated by the controller 235. A similar process occurs with regard to the object 140 and the vehicle 110 using the RMT array 120.

Although a laser range finding system is implemented in the preferred embodiment of the invention, the skilled artisan will readily appreciate that any range finding mechanism may be used instead, including, for example, sonar, infrared, microwave, or the like, without departing from the spirit and/or scope of the invention.

The ambient conditions surrounding the vehicle 110 are next determined at step 620. The determination may be made, for example, by the controller 235 sending a remote procedure call (RPC) instructions to the on-board computer 240, instructing the on-board computer 240 to detect ambient conditions, such as, for example, external/internal temperature and/or internal/external moisture content, using existing temperature and moisture sensors (not shown) on the vehicle 110. The determination may also be made, for example, by querying the on-board computer 240 for the ambient condition data, as is known in the art.

Once the ambient conditions have been detected, the controller 235 detects the speed S of the vehicle 110 at step 630. The speed S may be detected, for example, by the controller 235 sending a remote procedure call (RPC) instruction to the on-board computer 240, instructing the on-board computer 240 to detect the speed S for the vehicle 110, or by querying the on-board computer 240 for the speed S of the vehicle 110, as is known in the art. Alternatively, the controller 235 may be provided with an on-board GPS receiver (as mentioned earlier) that can provide a speed S for the vehicle 110, as is known in the art.

The controller 235, using the detected distance D1 to the vehicle 130, the detected speed S at which the vehicle 110 is traveling, the detected speed $S_2$ at which the vehicle 130 is traveling, and the detected ambient conditions, determines a target distance AD that should be maintained between the vehicle 110 and the vehicle 130. In order to increase processor efficiency, the determination of the target distance AD may be made by referring to a look-up-table stored in the ROM 224 of the controller 235 using the detected speed and ambient condition information.

Alternatively, the processor 220 may determine the target distance AD according to the relationship $D=S \times k$, where D is in feet (ft), S is in miles-per-hour (MPH) of the vehicle 110 and k is a predetermined constant in feet-hour-per-mile (ft-hr/mi), where k varies between, but not limited to, for example, approximately 0.5 ft-hr/mi and approximately 10 ft-hr/mi, depending on ambient conditions. In the preferred embodiment k=2 ft-hr/mi when the temperature is above freezing and there is no precipitation. However, the determination of the target distance AD is not limited to the above relationship, but may be determined according to any method deemed appropriate by the skilled artisan, depending on the particular application, without departing from the spirit and/or scope of the invention.

The controller 235 compares the detected distance D1 with the target distance AD at step 650. If it is determined that the detected distance D1 is greater than, or equal to the target distance AD ("YES" at step 650), the process ends, otherwise a message is displayed on the display 250 of the vehicle 110 at step 655 ("NO" at step 650). The displayed message may include, for example, a textual message notifying the user of vehicle 110 that the vehicle 110 is dangerously close to the vehicle 130 and that user should slow down, change lanes to avoid a collision, or take some other remedial action. It is understood that in addition, or instead of a displayed message, an audio message may be generated via, for example, the existing speaker system (not shown) in the vehicle, instructing the user to slow down, change lanes, or take some other remedial action.

After the message is displayed at step 655, the controller 235 determines at step 660 whether the detected vehicle 130 (or object) is traveling in the same direction as the vehicle 110. If it is determined that vehicle 110 is traveling in the same direction as the vehicle 130 ("YES" at step 660), then a determination is made at step 670 whether communication is possible with the vehicle 130 via, for example, transceiver 290. However, if a determination is made that the vehicle 110 is not traveling in the same direction as the vehicle 130 ("NO" at step 660), then a determination is made whether the vehicle 110 is in a reverse mode at step 665.

In determining the direction of travel of the vehicle 130 in step 660, the radius R1 is decreased as the speed of the vehicle 110 increases, minimizing the probability of sensing on-coming traffic. Moreover, the controller 235 is provided with a city mode, a rural mode and a highway mode. When the controller 235 is set to the city mode or rural mode, the constant k may be set to, e.g., 0.5 ft-hr/mi. However, when the controller 235 is set to the highway mode, the constant k may be set to, e.g., 2 ft-hr/mi.

If the controller 235 determines that the vehicle 110 is in a reverse mode ("YES" at step 665), then the controller causes the notifier 280 and/or transducer elements 305 through 308 to generate a manifest message at step 680, otherwise, at step 670, the controller determines whether communication is possible with vehicle 130 ("NO" at step 665). The generated manifest message may include a textual, audio and/or visual message generated by the notifier 280 and/or transducer 305 through 308.

For example, in the case where the notifier 280 includes a display device (not shown), such as, for example, an LED or LCD display mounted on the rear of the vehicle 110, a textual message, such as, for example, "WARNING" may be displayed on the display device. Additionally, an audible signal may be generated by the notifier 280, which varies in amplitude and/or frequency depending on the distance between the vehicle 110 and the object (e.g., object 140 in FIG. 1). Moreover, the transducer elements 305 through 308 may be driven by the transducer driver 227 to illuminate (e.g., the LED 320 located in each of the transducer elements 305 through 308) in a predetermined color, or in a predetermined range of colors, where the illuminated, e.g., LED 320 varies in color based on the distance between the vehicle 110 and the object. The predetermined color and/or range of colors may be set by the user by means of the interface 260.

If the controller 235 determines that communication is possible with the vehicle 130 ("YES" at step 670), then the controller 235, at step 675, causes a message to be sent via transceiver 290 to a corresponding transceiver (not shown) in the vehicle 130, otherwise the controller 235 determines whether an auto-response mode has been selected by the user of the vehicle 110, at step 685. The sent message instructs a corresponding controller (not shown) in the vehicle 130, to act as an agent for the controller 235 in the vehicle 110, and to cause a notifier (not shown) in the vehicle 130 and/or a RMT array (not shown) in the vehicle 130 to manifest a message at step 680. As noted earlier, the manifest message may be, for example, a textual message, such as, for example, the textual display "WARNING" displayed on a display device (not shown) mounted on the rear of the vehicle 130. Additionally (or alternatively), the manifest message may be, for example, the RMT array on the vehicle 130 being caused to illuminate various color lights. After the manifest message has been generated at step 680, the controller 235 determines whether an auto-response mode has been selected by the user of the vehicle 110, at step 685.

If the controller determines that an auto-response mode has been selected by the user ("YES" at step 685), then the controller 235 executes remedial actions at step 690 and returns to step 610, otherwise the process ends. The remedial actions may include, for example, activating the braking system on the vehicle 110 to gradually slow the vehicle down until the detected distance D1 between the vehicle 130 and the vehicle 110 is greater than, or equal to the target distance AD ("YES" at step 650). Additionally, the remedial action may include, deactivating a speed control on the vehicle 110, or temporarily setting the speed control on the vehicle 110 to a "coast" mode until the detected distance D1 is greater than, or equal to the target distance AD. It is understood that the remedial actions may be overridden by the user of the vehicle 110 via interface 260 or by manual actuation of the braking system and/or accelerating system on the vehicle 110.

A detection/notification program may be provided on a computer readable medium for carrying out the above discussed setup process. As the skilled artisan will readily understand, the setup program includes a code section for carrying out each of the steps 610 through 690, discussed above.

In alternative embodiments, dedicated hardware implementations for the controller 235, such as, for example, application specific integrated circuits (ASIC's), programmable logic arrays (PLA's) and other hardware devices, can be constructed to implement one or more of the methods described herein. Applications that may include various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor, or that cause a computer system to perform any one or more of the methods or operations disclosed herein.

The computer-readable medium may further include a solid-state memory, such as a memory card, that houses one or more non-volatile read-only memories. Further, the computer-readable medium can be a random access memory or other volatile re-writable memory. Additionally, the computer-readable medium can include a magneto-optical or optical medium, such as a disc or tape or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

Although the present specification describes components and functions implemented in the embodiments with reference to particular standards and protocols, the invention is not limited to such standards and protocols. Accordingly, replacement standards and protocols having the same functions are considered equivalents.

What is claimed is:

1. A blind spot image detector for a vehicle, comprising:
   at least one transducer structured and arranged to be
      selectively positionable in a detector position to detect objects in a blind spot of the vehicle and in a retracted position in a body of the vehicle;

a casing structured and arranged to selectively be flush with the body of the vehicle when the transducer is in the retracted position and not flush with the body of the vehicle when the transducer is in the detector position;

a display structured to issue an alert to a driver to the object in the blind spot of the vehicle.

2. The blind spot image detector according to claim 1, wherein the at least one transducer is part of a retractable mirror system, which further includes a mirror.

3. The blind spot image detector according to claim 1, wherein the at least one transducer and the casing are part of a retractable mirror system, which further includes a mirror.

4. The blind spot image detector according to claim 1, wherein the at least one transducer comprises a transducer array.

5. The blind spot image detector according to claim 1, wherein the at least one transducer is structured and arranged to retract into a panel of the vehicle.

6. The blind spot image detector according to claim 1, wherein the at least one transducer is structured and arranged to retract into a hood of the vehicle.

7. The blind spot image detector according to claim 1, further comprising an extending system structured and arranged to extend the at least one transducer outward from the body of the vehicle.

8. The blind spot image detector according to claim 1, wherein the at least one transducer comprises a transducer array and the transducer array and casing are part of a retractable mirror system, which further includes a mirror.

9. The blind spot image detector according to claim 8, further comprising an extending system structured and arranged to extend the retractable mirror system outward from the body of the vehicle.

10. The blind spot image detector according to claim 9, further comprising an automatic mechanism structured and arranged to control of the extending system.

11. The blind spot image detector according to claim 9, further comprising an manual mechanism structured and arranged to control of the extending system.

12. The blind spot image detector according to claim 1, wherein the at least one transducer is automatically positionable into the detector position.

13. The blind spot image detector according to claim 1, wherein the at least one transducer is manually positionable into the detector position.

14. The object detection system according to claim 1, further comprising a transducer fault detection process to determine whether the at least one transducer is not properly functioning.

15. The object detection system according to claim 1, wherein at least one transducer comprises a transducer structured to perform a self-diagnosis and issue a health status signal.

16. An object detection system for a vehicle having a front and rear end, comprising:

at least one transducer array mounted on at least one side of the vehicle, the transducer array being arranged to detect an object located in a detection area laterally to the at least one side of the vehicle; and a display structured to issue an alert to a driver to the object in the detection area.

17. The object detection system according to claim 16, wherein the display is further structured and arranged to display images of the object in the detection area.

18. The object detection system according to claim 16, further comprising a notifier structured and arranged to generate a signal that varies according to a distance to the object.

19. The object detection system according to claim 16, wherein the signal generated is an audible signal that increases in frequency as the distance to the object decreases.

20. The object detection system according to claim 16, further comprising a transducer fault detection process to detect whether any of the transducers of the at least one transducer array are not properly functioning.

21. A driving control for a vehicle, comprising:

at least one transducer array mounted on at least a front end of the vehicle, the transducer array being arranged to detect an object located in a detection area ahead the front end of the vehicle;

a transducer controller coupled to the transducers to determine a distance between the object and the transducer array;

a range finder structured and arranged to determine a speed at which the object is traveling;

a controller structured and arranged to obtain a speed of the vehicle and to determine a target distance to be maintained between the vehicle and the object;

a comparator for comparing the determined distance with the target distance;

wherein, when the target distance is greater than the determined distance, the controller directs at least one of an alert to a driver of the vehicle and automated remedial action.

22. The driving control according to claim 21, wherein the at least one of the alert to the driver of the vehicle and automated remedial action is taken until the target distance is less than or equal to the determined distance.

23. The driving control according to claim 21, wherein the automated remedial action comprise at least one of activating a braking system of the vehicle, deactivating a speed control system of the vehicle, temporarily setting a speed control system of the vehicle to a coast mode, adjusting a speed control system of the vehicle.

24. The driving control according to claim 21, wherein the alert to the driver of vehicle comprises at least one of a visual and an audible warning.

25. The driving control according to claim 24, wherein the visual warning includes at least one of textual messages, visual indicators, and lights and the audible warning includes at least one of an audio message and sounds.

26. The driving control according to claim 24, wherein, when the determined distance is less than the target distance and decreasing, the at least one of the visual and audible warning will increase in at least one of intensity, frequency, duration.

27. A driving control for a vehicle, comprising:

at least one transducer array mounted on at least a rear end of the vehicle, the transducer array being arranged to detect an object located in a detection area behind the rear end of the vehicle;

a transducer controller coupled to the transducers to determine a distance between the object and the transducer array;

a range finder structured and arranged to determine a speed at which the object is traveling;

a controller structured and arranged to obtain a speed of the vehicle and to determine a target distance to be maintained between the vehicle and the object;

a comparator for comparing the determined distance with the target distance;

a notifier structured and arranged to that, when the target distance is greater than the determined distance, the notifier directs at least one of a visual and an audible alert outside of the vehicle.

28. The driving control according to claim 27, wherein the notifier includes a display one of mounted on or in place of a rear window of the vehicle to direct the visual alert toward the object.

29. A control device in a motor vehicle, comprising:

at least one transducer array mounted on a portion of the vehicle located at a rear end portion of the vehicle, the transducer array being structured and arranged to detect an object located in a detection area, the detection area being in a region facing the transducer array;

a transducer controller coupled to the transducers to determine a distance between the object in the region facing the transducer array and the transducer array; and a system structured and arranged to react to a signal from the transducer controller in response to determining that the object is within a minimum distance to the portion of the vehicle on which the at least one transducer array is mounted.

30. The control device according to claim 29, wherein the at least one transducer array is mounted on a rear surface of the vehicle that, under normal driving conditions, faces in a direction behind a driver's back.

31. The control device according to claim 29, wherein the at least one transducer array is mounted on a rear fender.

32. The control device according to claim 31, wherein the at least one transducer array comprises transducers mounted on the vehicle that are oriented toward at least one side of the vehicle.

33. The control device according to claim 29, wherein, when the vehicle is stationary, the transducer controller is configured to detect objects approaching the at least one transducer array.

34. The control device according to claim 33, wherein the transducer controller is configured to transmit a signal to the system when it is determined that the object is coming close to contact with the portion of the vehicle on which the at least one transducer array is mounted.

35. The control device according to claim 29, wherein the system comprises an alarm system.

36. The control device according to claim 29, wherein the control device comprises an auto-response mode, whereby the controller is configured to execute remedial actions to respond to the detected condition.

* * * * *